United States Patent
Webster et al.

[11] Patent Number: 5,816,196
[45] Date of Patent: Oct. 6, 1998

[54] DEVICE AND METHOD FOR VOLITIONALLY ORIENTING FISH

[75] Inventors: James Lucian Webster; Peter Kenneth Bergman, both of Olympia, Wash.

[73] Assignee: Northwest Marine Technology, Inc., Shaw Island, Wash.

[21] Appl. No.: 627,763

[22] Filed: Mar. 29, 1996

[51] Int. Cl.⁶ .................................................. A01K 61/00
[52] U.S. Cl. ............................................................ 119/228
[58] Field of Search .................................... 119/201, 216, 119/217, 219, 224–228, 202, 203

[56] References Cited

U.S. PATENT DOCUMENTS

| | | |
|---|---|---|
| 4,854,455 | 8/1989 | Faivre . |
| 4,934,537 | 6/1990 | DeBourke . |

FOREIGN PATENT DOCUMENTS

| | | |
|---|---|---|
| 0 217 767 | 4/1987 | European Pat. Off. . |
| 0 311 879 | 4/1989 | European Pat. Off. . |
| 170 121 | 6/1992 | Norway . |

OTHER PUBLICATIONS

Brochure for Bioscanner Counting Tub, No Date, 5 pp.

*Primary Examiner*—Thomas Price
*Attorney, Agent, or Firm*—Kenyon & Kenyon

[57] ABSTRACT

A device and method for volitionally orienting fish relies upon the instinctive reactions of fish in order to ensure that when the fish exit a containing vessel, they do so with a uniform anatomical orientation, such as head-first, dorsal-side-up. The containing vessel is partially filled with water and has at least one exit. A flow of water is generated away from the exit of the vessel, causing any fish that are introduced into the vessel to orient themselves head-first into the direction of the flow. In addition, an environment within the water of the vessel may be created that is disturbing to the fish, thereby causing the fish to want to exit the vessel. In order for the fish to exit the vessel, they must actively swim toward and through the exit opening. After the fish exit the vessel, they may then be subjected to any number of fish handling operations—such as automated vaccinating, tagging/marking, sorting, and/or counting—where it may be beneficial to have fish delivered to a given location at a high rate of speed and with a uniform orientation.

56 Claims, 6 Drawing Sheets

DEVICE AND METHOD FOR VOLITIONALLY ORIENTING FISH

BACKGROUND OF THE INVENTION

1. Field of the Invention

The invention relates generally to the fields of pisciculture and aquatic resource management, and more particularly to a device and method for orienting live fish in, inter alia, a tagging/marking operation.

2. Description of the Prior Art

Pisciculture is the breeding, hatching, and rearing of fish under controlled conditions, in either fresh or salt-water environments, as a science or industry. Aquatic resource management involves the management of natural fish populations, as well as the management of governmental fish hatcheries where fish are raised for eventual release into the wild.

In both fields, it is often necessary to perform routine fish handling operations on a large number of live fish. Examples of these operations include sorting fish by size, electronic counting, automated vaccinations, and fish tagging/marking. When performing any of these operations, it is desirable that when the fish are delivered to the desired location where the operation is to be performed, the fish already be oriented according to the requirements of the given operation. Orientation of fish refers to the anterior-posterior (head-tail) and/or dorsal-ventral (spine-belly) position of the fish.

Devices for sorting fish by their size usually depend upon the girth of the fish. Typical sorting methods rely upon spacing between parallel bars that either allow or impede gravitational driven egress. Proper orientation in this case usually only requires that the anterior-posterior alignment of the fish be parallel to the spacing of the bars. Sorting of this kind can be refined by repeated exposure of the fish to spacing of varying widths. This type of size sorting is common at juvenile fish passage facilities for hydroelectric dams.

Other devices for sorting fish include those disclosed in U.S. Pat. No. 4,854,455 to Faivre and in U.S. Pat. No. 4,934,537 to DeBourke.

When sorting live fish with the device shown in the Faivre patent, the fish are held in a vertical orientation with their tails facing downward and are forcibly driven forward through a grading channel. As the fish are driven forward, the width of the grading channel becomes larger and larger until the fish exit the grading channel by gravity. Fish to be sorted by the device of the Faivre patent are loaded into a supply tank before passing through a chute into the sorting channel. No provision, however, is made for ensuring that the fish pass through the chute in any given orientation.

The device disclosed by DeBourke relies on fish being manually arranged on a horizontal conveyor belt, automatically transferred to a viewing conveyor belt, and then detected by a video camera mounted above the viewing belt before the fish are transferred to a sorting conveyor belt. A moveable deflector is mounted in front of a dividing wall on the sorting conveyor belt for deflecting individual fish on the sorting conveyor belt into one of multiple grading channels. The deflector moves in response to signals from an electronic circuit connected to the video camera.

Automatic fish counting primarily depends upon the separation of individual fish, rather than on their orientation, as they pass the point at which they are detected and counted. Separation between fish is critical in automatic counting operations because counting mechanisms may not be able to distinguish between (and therefore accurately count) individual fish that are overlapped as they pass by the counting mechanism. Provided there is some separation between fish, it is unimportant for automatic fish counting operations whether the fish pass the point at which they are detected and counted in a uniform orientation, or whether some fish pass by head-first, while others pass by tail-first.

An example of an automatic fish counting mechanism is the "Bioscanner" by Vaki Aquaculture Systems Ltd. of Reykjavik, Iceland. The Bioscanner system includes two acrylic V-shaped channels that are connected to the basin where the fish are gathered. Water is pumped into the V-shaped channels from the basin, which is tilted toward the inlets of the channels. The fish in the basin are flushed down the channels. All of the water flow in this process is into the channels. Because the fish are flushed into the channels by the water flow, there can be no assurances that the fish entering the channels are in any given orientation. Although some fish enter the channels head-first, dorsal-side-up, other fish are swept into the channels tail-first and/or ventral-side-up. At a given distance further down the channels from the channel inlets, the channels narrow down to the approximate width of a single fish and they curve sharply downward. The effect of the downward curving channels is to accelerate the fish as they pass through the channels, thereby increasing the separation between individual fish or, if the fish were overlapped when they entered the channels, opening up a separation between fish. Counting scanners are located at the bottom of the V-shaped channels and they count the fish as they pass by the scanners.

One example of an automated vaccination device is the "Vaccinations Machine" by SPINO A/S of Horsens, Denmark. This device requires that the fish first be anaesthetized and then manually oriented into the automated vaccination device to ensure proper injection. Large scale anaesthetization, however, requires time and money and results in the need to dispose of used anaesthetic solution. The requirements of large-scale anaesthetization, coupled with the need to manually orient fish, in the "Vaccinations Machine" limits the possible output of this type of device.

SUMMARY OF THE INVENTION

The operations of automated vaccinations and fish tagging/marking usually require precise orientation of the fish to be vaccinated and/or tagged/marked. Generally for these fish handling operations, a fish is properly oriented when it arrives at the location where the operation is to be performed in its natural "swim position"—i.e., head-first, dorsal-side-up.

Automated vaccination devices generally require precise orientation of the fish in order to achieve the desired result of properly injecting and vaccinating the fish. Because a needle is injected into the fish during automated vaccination operations, improper orientation of the fish could lead to improper injection, which could cause injury, death, or improper dosing.

Large-scale tagging/marking of fish has been important to resource managers for many years. Coded wire tags are frequently implanted into young fish grown at hatcheries before the fish are released into the wild. The coded tags allow aquatic resource managers and scientists to track the migration, growth, and survival rate of fish released from different hatcheries and to evaluate the effectiveness of various fish management programs. Commercial aquaculture operations also frequently tag/mark their own fish.

As resource pressures increase, tagging/marking fish is becoming an increasingly significant aquatic resource management tool. Currently there are over 100 fish hatcheries in the State of Washington alone that raise fish for eventual release into the wild. Under the Washington State Mass Marking and Selective Fisheries Bill, all hatchery coho salmon will be required to be identified with source-identifying marks before being released into the wild. In Washington State, it is estimated that soon over 200 million fish will be tagged/marked each year.

Currently, the most common way for tagging/marking fish at fish hatcheries is to do it by hand. Although an automated injector may be used to inject the coded wire into the fish, human intervention is required to ensure proper positioning of the device and to activate each injection sequence. Currently there are no known fully automated tagging/marking systems.

A fully automated tagging/marking system would enable aquatic resource managers to keep up with the magnitude of proposed tagging/marking plans such as those in Washington State. An automated fish tagging/marking system would need to perform at least two functions: implant coded wire tags at a proper location into the fish and/or remove adipose fins. Because both of these operations require either cutting or piercing tissue at precise locations, precise orientation of the fish is essential. Furthermore, the required output for such an automated fish tagging/marking machine should be at least two fish per second. Because of the speed at which an automated tagging/marking machine would need to operate, fish will have to be delivered at a high rate and in proper orientation (head-first, dorsal-side-up) to the desired location where the tagging/marking is to be performed.

Automated fish handling operations require that fish be delivered to a desired location in a proper orientation for the operation to be performed. Precise orientation of the fish is desired in automated vaccination and fish tagging/marking operations. In automated fish counting operations, separation between individual fish, rather than precise orientation, is required; however it is still advantageous that fish be delivered to a given location at a rapid rate. Of course if the counting machine is subject to possible variations as a result of fish orientation, it would be advantageous to deliver the fish to the desired location with a precise orientation.

Currently there is no device in the fields of pisciculture or aquatic resource management that does not require excessive human intervention and that provides for the efficient, high speed orientation of live fish so that they reach a desired location in a uniform head-first, dorsal-side-up orientation.

The present invention is a device and method for volitionally orienting fish that allows for the efficient, high speed orientation of live fish so that fish handling operations such as sorting, counting, vaccinating, and/or tagging/marking can be accomplished at a high speed without the need for anaesthetization of the fish or excessive human intervention.

Accordingly, an object of the present invention is to deliver fish to a desired location at a high rate of speed and in a uniform head-first, dorsal-side up orientation.

Another object is to deliver fish to a desired location with some separation between individual fish.

Additional objects, advantages, and novel features of the invention will be set forth in part in the description which follows, and in part will become apparent to those skilled in the art upon examination of the following or may be learned by practice of the invention.

BRIEF DESCRIPTION OF THE DRAWINGS

The invention will be more readily understood through the following detailed description, with reference to the accompanying drawings, in which.

DESCRIPTION OF THE PREFERRED EMBODIMENT

The present invention is a device for volitionally orienting fish, which includes a vessel 1 with a lower interior surface 2 and an apertured end 3. The apertured end 3 contains an exit aperture 4. The exit aperture 4 is generally of a size slightly wider than the fish to be oriented. The vessel 1 is designed to contain water and to receive the fish that it is desired to orient.

In the preferred embodiment of the invention, the device is configured to orient fingerling fish of the salmonidae family; such fish have average lengths of approximately three to seven inches. If it is desired to orient a different size or species of fish, the stated dimensions of the preferred embodiment of the device and the various fish disturbing features utilized would be tailored to accommodate the particular fish being oriented.

The supply of fish to be oriented is introduced into the vessel 1 through a supply channel 14; the fish being from a source, such as a supply tank (not shown), located outside of the vessel 1 and in fluid communication with the supply channel 14. It would also be possible, however, to introduce the fish into the vessel 1 manually, such as from a net, or to connect the device to another fish handling device, such as a device for sorting and grading fish, so that the fish undergo multiple fish handling operations in succession.

In accordance with an aspect of the invention, a flow F of water in the vessel 1 in a direction away from the apertured end 3 is generated. In the preferred embodiment of the invention, a volume of water is introduced through the flow apertures 6 and directed toward the side 9 of the vessel 1 located opposite the apertured end 3. The lower interior surface 2 of the vessel 1 is tilted by placing blocks 15 underneath the lower interior surface 2 proximate to the apertured end 3, so as to facilitate the movement of water in a direction away from the apertured end 3.

When placed in a body of water, it is the natural reaction of fish to orient themselves head-first, and dorsal-side-up, into any flow. The flow F away from the apertured end 3 is designed to be of sufficient strength so that any fish exiting the vessel 1 through the exit aperture 4 must swim against the flow F in order to pass through the exit aperture 4. Thus, in order to counteract the water flow F near the apertured end 3, the fish must swim toward the exit aperture 4 in a head-first, dorsal-side-up orientation. This ensures that when fish exit the vessel 1 through the exit aperture 4, they are in the proper head-first, dorsal-side-up orientation.

The strength of the flow F away from the apertured end 3 diminishes the farther the flow F is from the apertured end 3. The flow F diminishes because the depth of the water in the vessel 1 increases the further one gets from the source of the flow F, i.e., the flow apertures 6. In the preferred embodiment of the invention, the lower interior surface 2 is slanted such that the depth of the water proximate to the apertured end 3 is less than the average depth of the water in the vessel 1, assuming a flat lower interior surface 2. Thus, in the preferred embodiment, the flow of water F away from the apertured end 3 is very weak as one nears the side 9 opposite the apertured end 3.

The flow F must not be so strong as to prevent fish from exiting the vessel 1 through the exit aperture 4 or to drive fish away from the apertured end 3. However, the flow F must be of a strength sufficient to ensure that the fish must actively swim against the flow F in order to order to overcome the flow F and exit the vessel 1 through the exit aperture 4. Also, the flow F must be of sufficient strength to ensure that any flow in the direction of the exit aperture 4, caused by the volume of water exiting the vessel 1 through the exit aperture 4, is minimal so that weak fish will not be washed out of the vessel 1. The strength and volume of the flow F away from the apertured end 3 that is required to properly orient a given species of fish will vary with respect to the type of fish to be oriented. In the preferred embodiment of the invention, a flow F sufficient to orient fingerling fish of the salmonidae family was generated by introducing water into the vessel 1 through the flow apertures 6 at a rate of approximately three gallons per minute.

A flow F may be generated by introducing water into the vessel 1 through the lower interior surface 2, the apertured end 3, a side interior surface 5, or from above the water in the vessel 1. Water may be pumped into the vessel, or may be forced into the vessel 1 by pressure or by gravity. In the preferred embodiment of the invention, water is pumped into the vessel 1 through flow apertures 6 located proximate to the apertured end 3 at a rate of approximately three gallons per minute. Although the device may contain any number of flow apertures, no flow apertures would be required if water was forced into the vessel 1 through a portion of the exit aperture 4 or carried into the vessel 1 through tubing or piping. The flow apertures 6 may be located in one or more of the following surfaces: the lower interior surface 2, a side interior surface 5, or the apertured end 3, but should be located at the end of the vessel 1 containing the exit aperture 4. In the preferred embodiment of the invention, eleven flow apertures 6 are positioned in the lower interior surface 2, along the apertured end 3, within one inch of the apertured end 3. In the preferred embodiment of the invention, the flow apertures 6 have diameters of 0.5 inches. The flow apertures 6 should be connected to a source of water under pressure.

To facilitate the flow F of water in the vessel away from the apertured end 3, another aspect of the invention is to slant the lower interior surface 2 such that the depth of the water proximate to the apertured end 3 is less than the average depth of the water in the vessel 1, assuming a flat lower interior surface 2. In the preferred embodiment of the invention, the degree of slant $\phi$ is such that the depth of the water proximate to the apertured end 3 is approximately 0.25 inches less than the depth of the water proximate to the side 9 of the vessel 1 opposite the apertured end 3, when the side 9 of the vessel 1 opposite the apertured end 3 is approximately 32.25 inches away from the apertured end 3. The preferred method of slanting the lower interior surface 2 is to elevate the lower interior surface 2 proximate to the apertured end 3 by placing blocks 15 beneath the lower interior surface 2 proximate to the apertured end 3, or fixing an angled block or wedge to the lower exterior surface.

In accordance with a further aspect of the invention, the device creates an environment within the vessel 1 that is uncomfortable to fish, thereby causing the fish to seek a way out of the vessel 1. When fish are placed in an uncomfortable situation, their natural reaction is to seek a way out of the situation. In the present device, the only method of egress from the vessel 1 is for the fish is to pass through the exit aperture 4.

In accordance with the present invention, various devices for creating an environment that is uncomfortable to the fish within the vessel 1 are provided.

The present invention may include a device, such as a light, for illuminating the water of the vessel 1 or for illuminating the lower interior surface 2 of the vessel 1. In a brightly lit environment, the dark dorsal side of a fish contrasts with bright backgrounds, making the fish feel vulnerable to predators. Because brightly illuminated water or a brightly illuminated substrate makes fish feel more vulnerable to predators, bright illumination is instinctively disturbing to fish. When fish are placed in a brightly-lit environment, their natural reaction is to attempt to leave the brightly-lit area. The present invention may also include a device for: introducing sound waves into the water of the vessel 1, e.g., by a speaker; introducing shock waves into the water of the vessel 1, e.g., by an oscillator or vibrator; generating an odor in the water of the vessel 1, e.g., by placing animal or plant matter in the water of the vessel 1; introducing chemicals into the water of the vessel 1, e.g., by placing salt, shark repellent, or citric acid in the water of the vessel 1; creating an electric current in the water of the vessel 1, e.g., by placing an anode proximate to the exit aperture 4 and a cathode proximate to the side 9 opposite the apertured side 3 and running a current between the anode and cathode; or providing visual stimulus for the fish, e.g., by placing models or pictures of predators proximate to the side 9 opposite the apertured side 3. The present invention may also include any combination of the above devices or none at all. In the preferred embodiment of the invention, an environment within the vessel 1 that is uncomfortable to fish is created by illuminating the water of the vessel 1.

Acoustic devices, vibrational devices, odorous devices, chemical devices, electrical devices, and visual devices include generating stimuli that either attract or repel fish. For example, an odorous device might include introducing an odor proximate to the exit aperture 4 that attracts fish, or introducing an odor proximate to the interior surface 9 opposite the apertured end 3 that repels fish. Likewise, visual devices might include making the exit aperture 4 appear more inviting to fish by placing picture or models of aquatic vegetation proximate to the exit aperture 4, or it may include making the area near the interior surface 9 opposite the apertured end 3 to appear more hostile to fish by placing pictures or models of predators in that area. The variety of fish disturbing means that could be used successfully in both the device for volitionally orienting fish and in the method for volitionally orienting fish is certainly not limited by the above-recited list. The basic principle is to either repel fish from a given area (thereby "pushing" them toward the exit aperture 4), or to attract them to a given area (thereby "pulling" them toward the exit aperture 4).

The vessel 1 may be illuminated by using natural or artificial light sources to illuminate the water in the vessel 1 or to illuminate the lower interior surface 2 of the vessel 1. In accordance with a further aspect of the invention, the effect of the illumination may be enhanced by increasing the reflectiveness to light of an interior surface of the vessel 1. The effect of the illumination may also be enhanced by creating illumination gradations such that the intensity of the illumination of the water proximate to the exit aperture 4, or of the portion of the lower interior surface 2 proximate to the exit aperture 4, is less than the average intensity of the illumination of the water in the vessel 1 or of the lower interior surface 2. In the preferred embodiment of the invention, the water in the vessel 1 is illuminated by natural lighting when the device is used outdoors and by bright ambient lighting when the device is used indoors. The effectiveness of the illumination could be enhanced by shining bright lights, such as halogen lamps, on the surface of the water when the ambient light is insufficient to sufficiently disturb the fish. Also, the effectiveness of the illumination could also be enhanced by shading the exit aperture 4 because fish in an exposed environment, such as in a shallow, brightly-lit vessel, are instinctively attracted to dark sections of water and would naturally want to swim toward the less-bright area.

The reflectiveness to light of an interior surface of the vessel 1 may be increased by covering the interior surface with a reflective coating, such as mirrored glass, or by painting the interior surface with a reflective color. In the preferred embodiment of the invention, the reflectiveness of the lower interior surface 2 is increased by painting the lower interior surface 2 the color white. The color white is also instinctively unsettling to fish because their dark dorsal sides contrast with the white background, making the fish feel vulnerable to predators.

Fish disturbing also includes creating and/or maintaining a crowded environment within the vessel 1 such that the number of fish per square foot of swimmable water surface area in the vessel 1 (i.e., excluding those areas in which the fish can not swim) is larger than a number with which the fish are instinctively comfortable. In the preferred embodiment of the invention, a crowded environment within the vessel 1 may be created by introducing enough fish into the vessel 1 that the number of fish per square foot of swimmable water surface area was greater than five. No minimum or maximum number of fish per square foot, however, is required. When operating the present device, it is preferred that the number of fish per square foot of swimmable water surface area be kept as high as possible, provided the device continues to function properly.

In addition, fish disturbing also includes creating and/or maintaining a shallow environment within the vessel 1 such that the average depth D of the water in the vessel 1 is less than twice the average height of the fish to be oriented. In the preferred embodiment of the present invention, the average depth D of the water in the vessel 1 is maintained at approximately 1.5 inches, a level at which portions of the fish to be oriented are partially out of water, but a depth adequate for proper oxygenation of the fish and for allowing the fish to successfully swim toward the exit aperture 4. If the exit aperture 4 is a channel, as it is in the preferred embodiment of the invention, the depth of the water at the exit aperture 4 should be less than twice the average height of the fish to be oriented so as to ensure that two fish cannot exit the vessel 1 through the exit aperture 4 at the same time by having one fish swim above the other.

The device removes water from the vessel 1 so that a given average depth of the water in the vessel 1 can be maintained. When fish are introduced into the vessel 1, a volume of water is usually included with them. In addition, water can enter the vessel 1 from the flow apertures 6. Although a volume of water continuously exits the vessel 1 through the exit aperture 4, the net result of all of the inflows and outflows of water into and out of the vessel 1 is usually to increase the volume of water in the vessel 1. Therefore, the depth D of the water in the vessel 1 must be controlled, lest the water overflow the vessel 1 by pouring over an interior side 5 or the apertured end 3. The depth D of the water in the vessel 1 can be controlled in this device by the depth control feature.

The depth control feature can include having drainage apertures in the lower interior surface 2, in the side 9 opposite the apertured end 3, or in an interior side 5; pumping water out of the vessel 1; or having a depth control end 9 of the vessel of a height such that water may exit the vessel 1 by flowing over the top of the depth control end 9. Although the depth control end 9 may be designed to function as an interior side 5, in the preferred embodiment of the invention the vessel 1 has a depth control end 9 that is located opposite the apertured end 3. A further aspect of the invention is for the depth control end 9 to be of a height less than the height of the apertured end 3. Thus, in the preferred embodiment of the invention the depth control end 9 is 1.375 inches in height, while the interior sides 5 and the apertured end 3 are each 4.0 inches in height.

A problem with allowing water to exit the vessel 1 by flowing over the top of a depth control end 9 is that the fish to be oriented must not be allowed to exit the vessel 1 over the top of the depth control end 9. When any depth control feature is used, the fish to be oriented must not be allowed to exit the vessel 1 without passing through the exit aperture 4. Therefore, a fish barrier 10 is attached to the vessel 1 so as to allow water to exit the vessel 1 via the depth control feature, but not to allow fish to exit the vessel 1 via the depth control feature (such as passing over the top of the depth control end 9 or through a drainage aperture), unless the depth control feature is also functioning as the exit aperture 4. It is preferred that the fish barrier 10 be constructed of either a plastic or cloth mesh, such as the types used in making fishing nets, so that fish brushing up against the fish barrier 10 will not be injured. In the preferred embodiment of the invention, the fish barrier 10 is attached to the lower interior surface 2 proximate to the depth control end 9 and traverses the width of the vessel 1 between the two interior sides 5 and attaches to the two interior sides 5. In the above-described configuration of the preferred embodiment of the invention, the fish barrier 10 blocks fish from exiting the vessel 1 by blocking the fish from swimming over the depth control end 9.

Another aspect of the invention is to allow for an even flow in the water in the vessel 1 away from the apertured end 3. It is desirable that the flow in the water in the vessel 1 away from the apertured end 3 be a homogeneous current with a minimum of turbulence in the water flow. A homogeneous flow is desirable because flow variations within the vessel 1 may disorient the fish or may create certain spots within the vessel 1 that are comfortable to fish, thereby making the fish less likely to seek a way to exit the vessel 1. To this end, the fish barrier 10 may be constructed with a plurality of apertures 11 to allow water to flow through the fish barrier 10 with a minimum of flow blockage. The apertures 11 should have diameters smaller than the diameters of the smallest fish one wishes to orient. In the preferred embodiment of the invention, the fish barrier 10 is constructed of a plastic mesh with 0.25 inch apertures 11.

An uncomfortable environment in the water of the vessel 1 will cause the fish within the vessel 1 to want to exit the vessel 1, and they can only do so through the exit aperture 4. Because the fish are not forced or flushed out the exit aperture 4, and because the flow F of water is away from the exit aperture 4 (except for the small localized flow of water exiting the vessel 1 through the exit aperture 4), the fish must swim through the exit aperture 4 in order to exit the vessel 1. Fish cannot swim backwards (i.e., tail-first) and they do not swim upside down (belly-up) except when injured or anaesthetized. Thus, as the fish swim through the exit aperture 4, they are uniformly oriented in a head-first, dorsal-side-up orientation.

Figure 5:
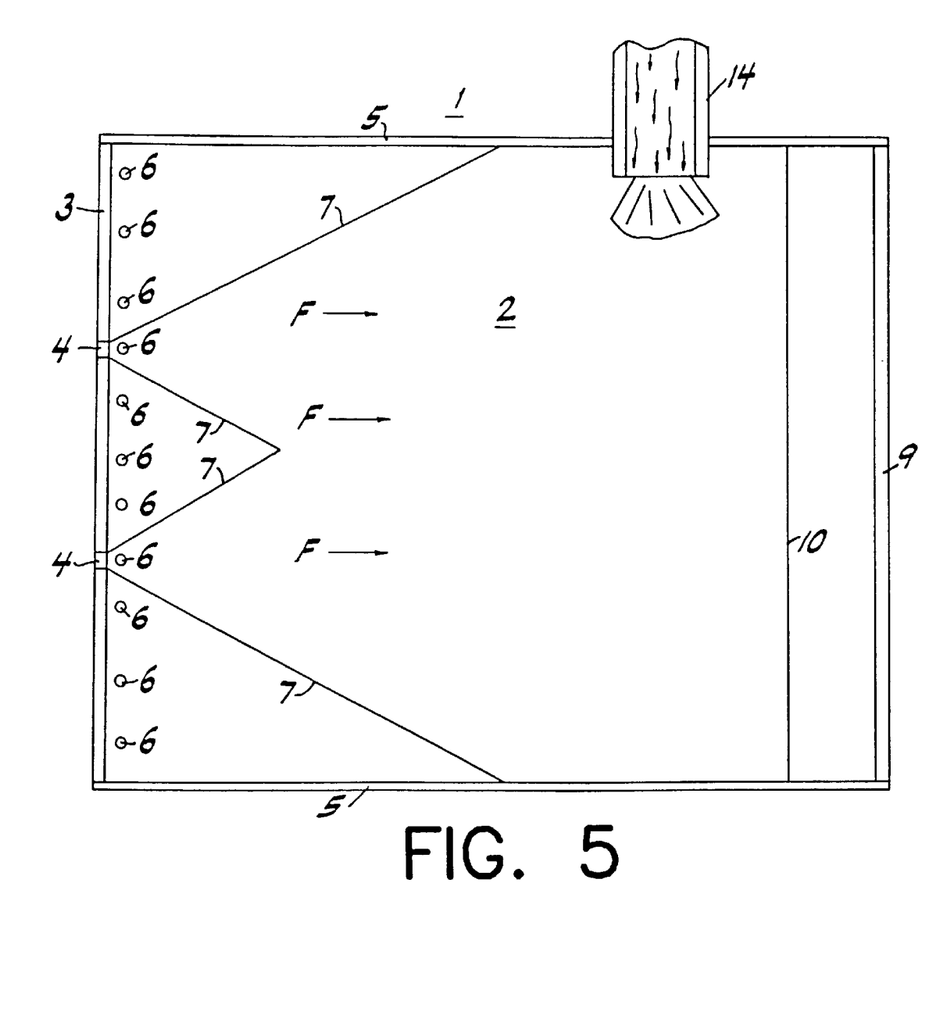
FIG. 5 is a top view of an alternative embodiment of the present invention.

To ensure that the fish that swim toward the apertured end 3 reach the exit aperture 4, a channel guide 7 may be used. A channel guide 7 is connected to the vessel 1 for guiding the fish toward the apertured end 3 so that the fish exit the vessel 1 through the exit aperture 4. It is preferred that the channel guide 7 be constructed of either a plastic or cloth mesh, such as the types used in making fishing nets, so that fish brushing up against the channel guide 7 will not be injured. Although the channel guide 7 may be a separate structure apart from the vessel 1, an interior side wall 5 of the vessel 1 could alternatively be angled toward the apertured end 3 and effectively accomplish the function of the channel guide 7. Furthermore, although the preferred embodiment of the invention calls for two channel guides 7 that form a V-shape with its apex at the exit aperture 4, any number or shape of channel guides 7, including a conical channel guide, may be used (see, e.g., FIGS. 5 and 6), provided it is designed to guide fish toward the apertured end 3 and/or the exit aperture 4.

Because a previous aspect of the invention was to allow for an even flow in the water in the vessel 1 away from the apertured end 3, and because it is desirable that the flow in the water in the vessel 1 away from the apertured end 3 be a homogeneous current with a minimum of turbulence in the water flow, the channel guide 7 may be constructed with a plurality of apertures 8 to allow water to flow through the channel guide 7 with a minimum of flow blockage. The apertures 8 should have diameters smaller than the diameters of the smallest fish one wishes to orient using the device. In the preferred embodiment of the invention, the channel guide 7 is constructed of a plastic mesh with 0.25 inch apertures 8.

It is desirable that a device for the volitional orientation of fish be able to deliver fish to a given location with some separation between fish. Thus, in accordance with an aspect of the invention, the exit aperture 4 is sized to allow only one fish to exit the vessel 1 at a given time. The exit aperture 4 has both an entrance end 12 and an exit end 13. When exiting the vessel 1, the fish first passes through the entrance end 12 of the exit aperture 4 before exiting the apertured end 3 through the exit end 13 of the exit aperture 4. Usually the diameters of the entrance end 12 and exit end 13 of the exit aperture 4 are equal, but the exit aperture 4 could be made to narrow or expand along its length such that the diameter of the exit end 13 was either smaller or larger than that of the entrance end 12. In the preferred embodiment of the invention, the diameters of the entrance end 12 and exit end 13 of the exit aperture 4 are equal. Furthermore, although the diameter of the exit aperture 4 may be adjustable to accommodate a wide variety of species of fish, such as by having slidably mounted walls 3 that can narrow or expand the width of the exit aperture 4, in the preferred embodiment of the invention, the diameter of the exit aperture 4 is fixed at 0.75 inches, an appropriate setting for allowing only one fish to pass through the exit aperture 4 at a time, where the fish to be oriented are fingerling fish of the salmonidae family; these fish having average lengths of approximately three to seven inches. The exit aperture 4 of the preferred embodiment of the invention is constructed as a covered channel. This configuration is preferable because it helps prevent fish from losing their head-first, dorsal-side-up orientation as they pass through the exit aperture 4 by restricting their freedom of movement.

After the fish exit the vessel 1 through the exit aperture 4, they may be directed down an exit channel (not shown) toward wherever it is desired to deliver properly oriented fish. A fish handling device, such as an automated tagging/marking machine or an automated vaccination device, could also be connected to the exit aperture 4 of the vessel 1, or to the end of the exit channel (not shown) leading away from the exit aperture 4. The function of such a fish handling device would be to perform fish handling operations on the fish that have been properly oriented by the present invention.

In operation of the present invention, fish are introduced into a vessel 1 through a supply channel 14. The vessel 1 contains water and has an apertured end 3 that contains an exit aperture 4.

A flow F is created in the vessel 1 in a direction away from the apertured end 3 to ensure proper orientation. When placed in a body of water, it is the natural reaction of fish to orient themselves head-first, and dorsal-side-up, into any flow. The flow F away from the apertured end 3 is designed to be of sufficient strength so that any fish exiting the vessel 1 through the exit aperture 4 must swim against the flow F in order to pass through the exit aperture 4. Thus, in order to counteract the water flow F near the apertured end 3, the fish must swim toward the exit aperture 4. Fish can not swim backwards (tail-first) and they do not swim upside down (belly-up), except when they are injured or anaesthetized, thus the fish that exit the vessel 1 are in a uniform head-first, dorsal-side-up orientation as the pass through the exit aperture 4. Therefore the flow F ensures that when fish exit the vessel 1, they are in the proper head-first, dorsal-side-up orientation.

A flow F can be generated in the water of the vessel 1 in a direction away from the apertured end 3 of the vessel 1 by introducing water proximate to the apertured end 3 or through the apertured end 3. Furthermore, it is an additional aspect of the present invention that the vessel 1 could be tilted such that the depth of the water proximate to the apertured end 3 is less than the average depth of the water in the vessel 1, assuming a flat lower interior surface 2 of the vessel 1. By tilting the vessel 1 in this manner, water is encouraged to flow away from the area proximate to the apertured end 3 and to flow in the direction that the vessel 1 is tilted.

Because fish react to a number of environmental variables when placed in a controlled environment, creating an environment within the vessel 1 that is unsettling to fish encourages fish to volitionally exit the vessel 1 through the exit aperture 4 in order to get clear of the unsettling environment. The environmental variables that can be used to create an environment that is unsettling to fish may include fish crowding (measured by the number of fish per square foot of swimmable water surface area), water depth, substrate color, light, sound, vibrations, smells, chemicals, electric currents, visual images, and water flow. The method of the present invention relies on the manipulation of some or all of these environmental variables to cause the fish to volitionally orient themselves within the controlled environment and to then exit the environment.

An environment that is unsettling to fish is created within the vessel 1 by initially introducing the fish into the vessel 1 in a group. Fish respond adversely to a crowded environment and will attempt to leave a crowded area. Another aspect of the present invention is to maintain a shallow depth D of the water in the vessel 1. When fish are placed in a shallow environment, they feel exposed and will attempt to leave the area. The shallow depth D of the water in the vessel 1 likewise contributes to the crowded environment within the vessel 1 by keeping the volume of water in the vessel 1 low. In the preferred embodiment of the present invention, the average depth D of the water in the vessel 1 is maintained at approximately 1.5 inches.

Still another aspect of the present invention is to maintain a crowded environment within the water of the vessel 1. After an initial number of fish enter the vessel 1, the number of fish per square foot of swimmable water surface area in the vessel 1 decreases as fish begin to exit the vessel 1. Thus, unless there are no more fish that one desires to orient, additional fish should be added to the vessel 1 to maintain a crowded environment within the water of the vessel 1.

The water in the vessel 1, or the lower interior surface 2 of the vessel 1, may be illuminated by light. Brightly illuminated water, or a brightly illuminated substrate, is disturbing to fish and when placed in a brightly lit environment, the natural reaction of fish is to seek a darker environment. The method for illuminating the water in the preferred embodiment of the invention is to place the device in an area with bright ambient light or to shine a bright light on the surface of the water in the vessel 1 if the ambient light is too dim for the device to function properly. It is also preferable to paint the lower interior surface 2 of the vessel 1 white because the color white enhances the reflectiveness of the lower interior surface 2 and increases the degree to which the water in the vessel 1 is illuminated. The color white is also instinctively unsettling to fish because their dark dorsal sides contrast with the white background, making the fish feel vulnerable to predators.

Additional aspects of the invention include generating sound waves in the water in the vessel 1, generating shock waves in the water in the vessel 1, creating a smell in the water in the vessel 1, adding chemicals to the water in the vessel 1, electrifying the water in the vessel 1, or placing visual images proximate to or in the water in the vessel 1. All of the above stimulus could either be disturbing to fish, such that when confronted with the stimulus in a given area, fish will seek to exit that area and head toward an area with lower levels of stimulus, or the stimulus could be attractive to fish, whereby the fish would seek to swim toward the stimulus. The variety of ways by which one can disturb the fish to such an extent that they desire to exit the vessel 1 is certainly not limited to the list of methods recited above.

After the fish have exited the vessel 1 in which they are placed by swimming through an exit aperture 4 in a uniform head-first, dorsal-side-up orientation, they can then be delivered to a desired location to undergo any number of fish handling operations.

Figure 1:
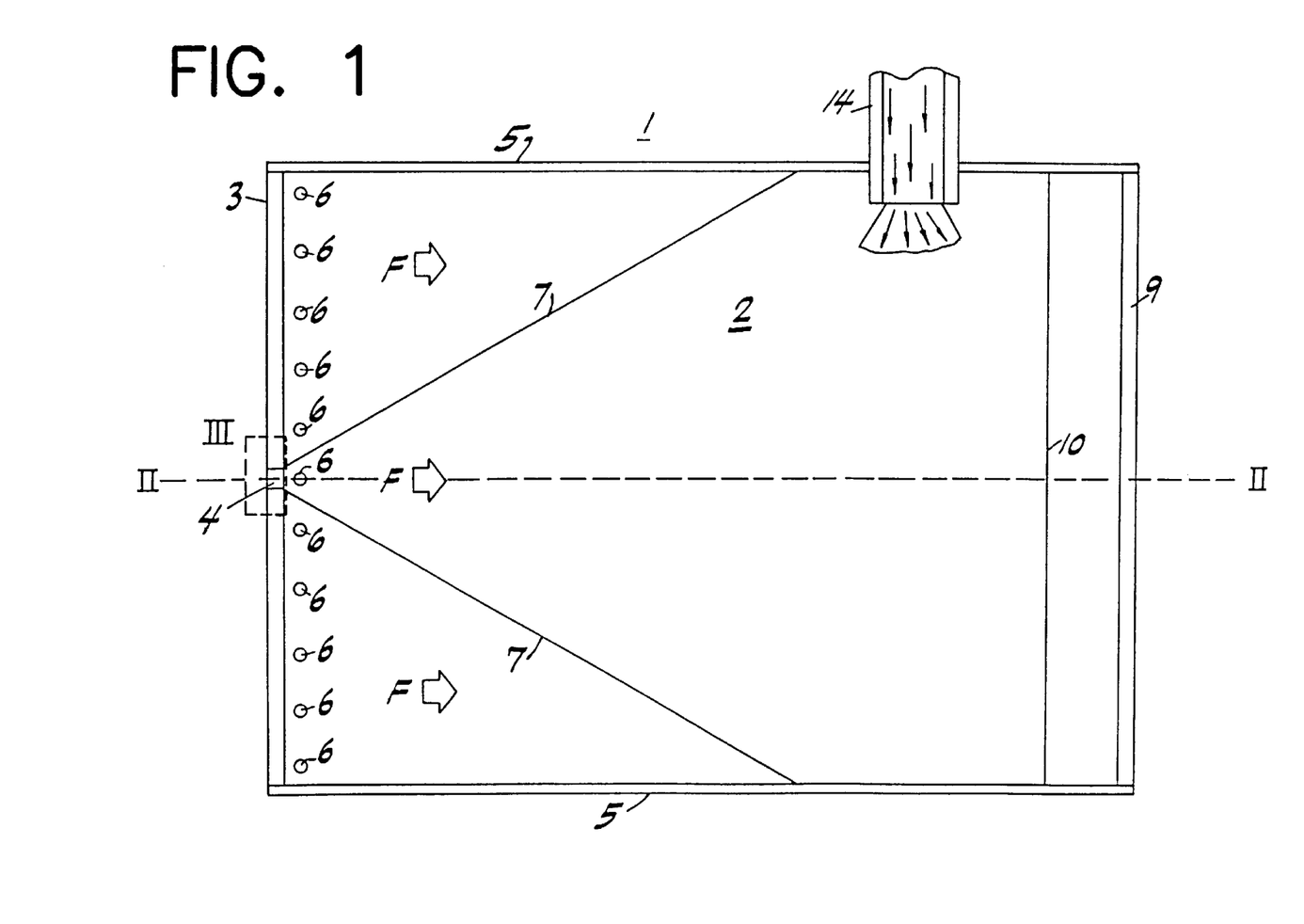
FIG. 1 is a top view of an embodiment of the present invention.
Figure 2:
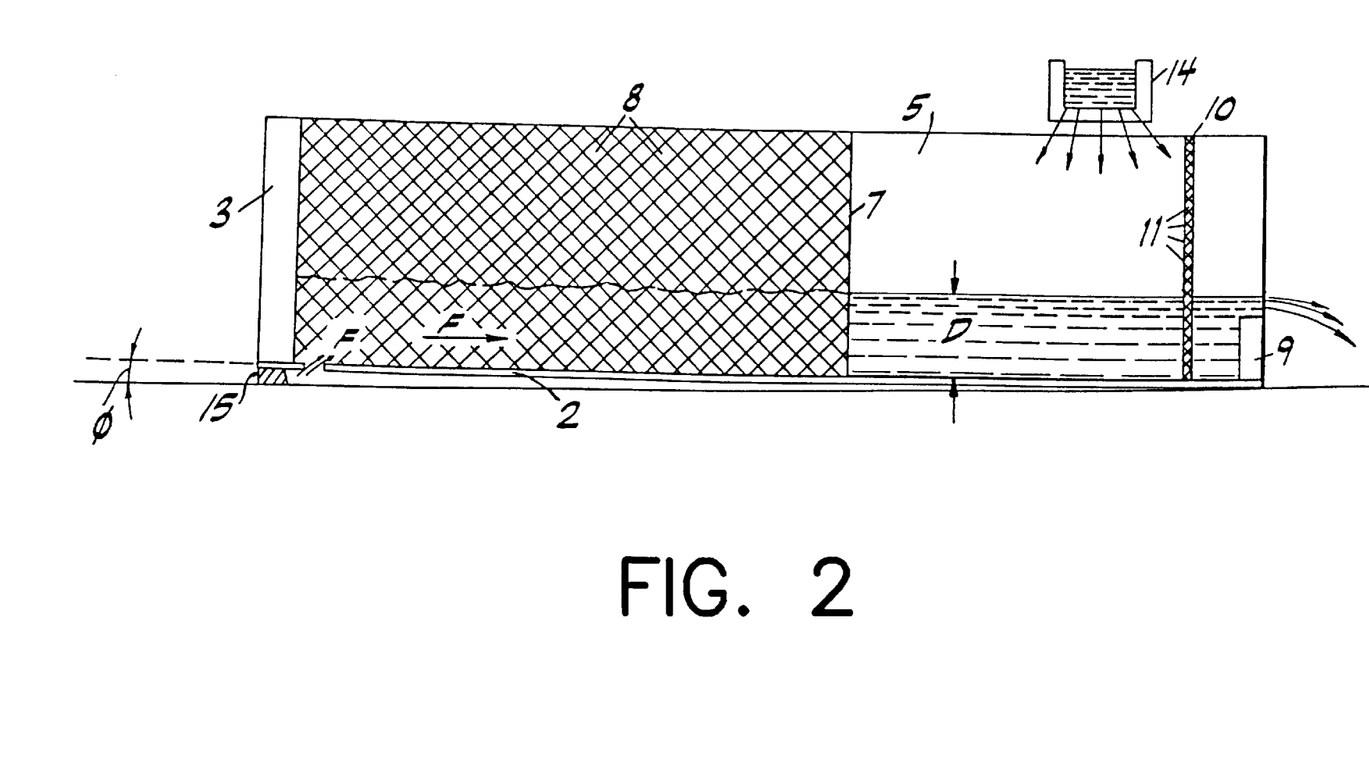
FIG. 2 is a cross-sectional side view of the embodiment of FIG. 1, through line II—II.
Figure 3:
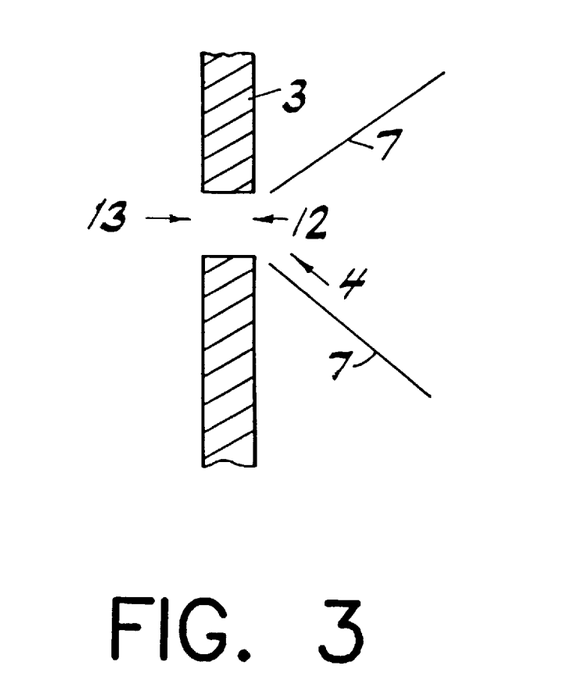
FIG. 3 is a detail view of the exit aperture of the present invention.
Figure 4:
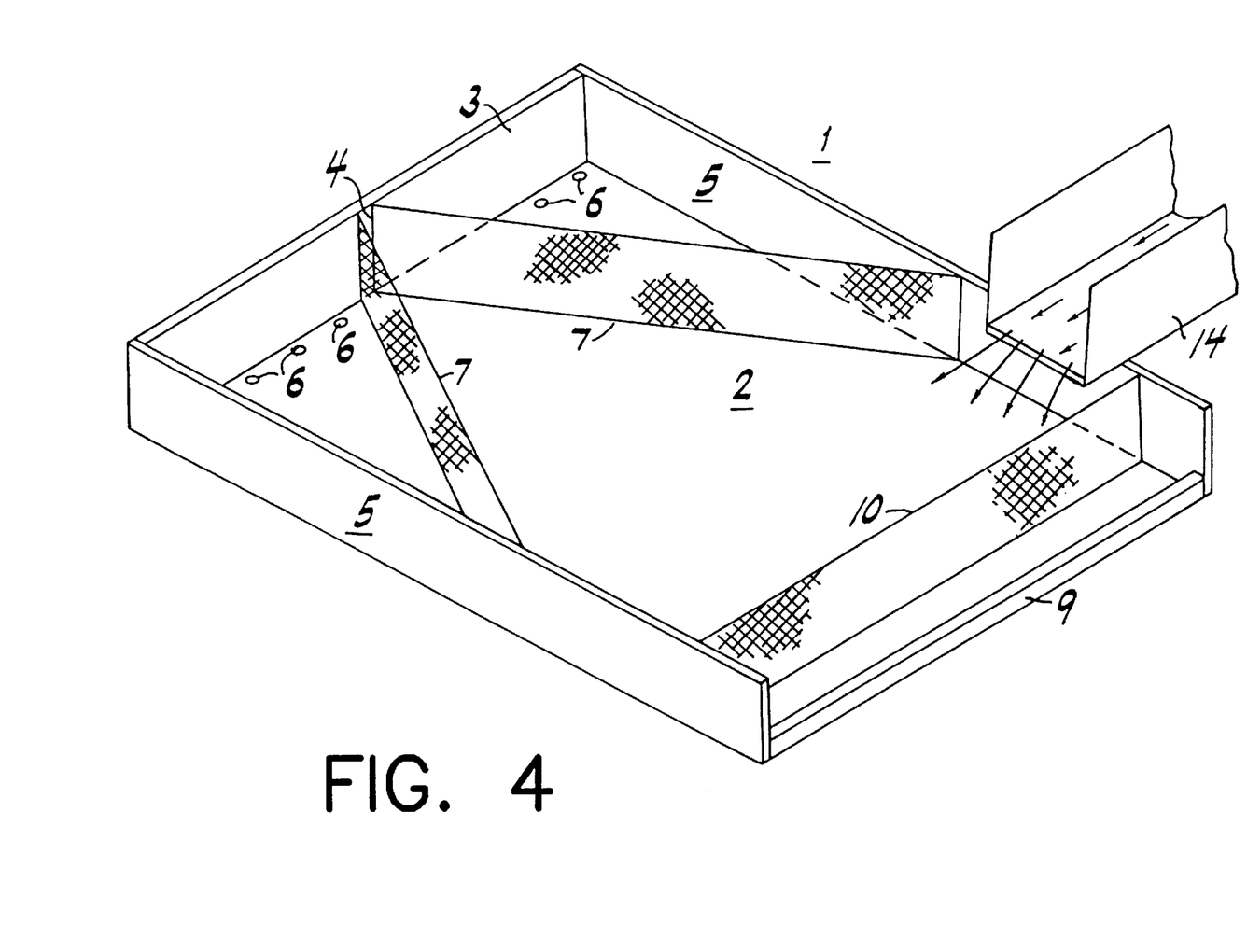
FIG. 4 is perspective view of an embodiment of the present invention.
Figure 6:
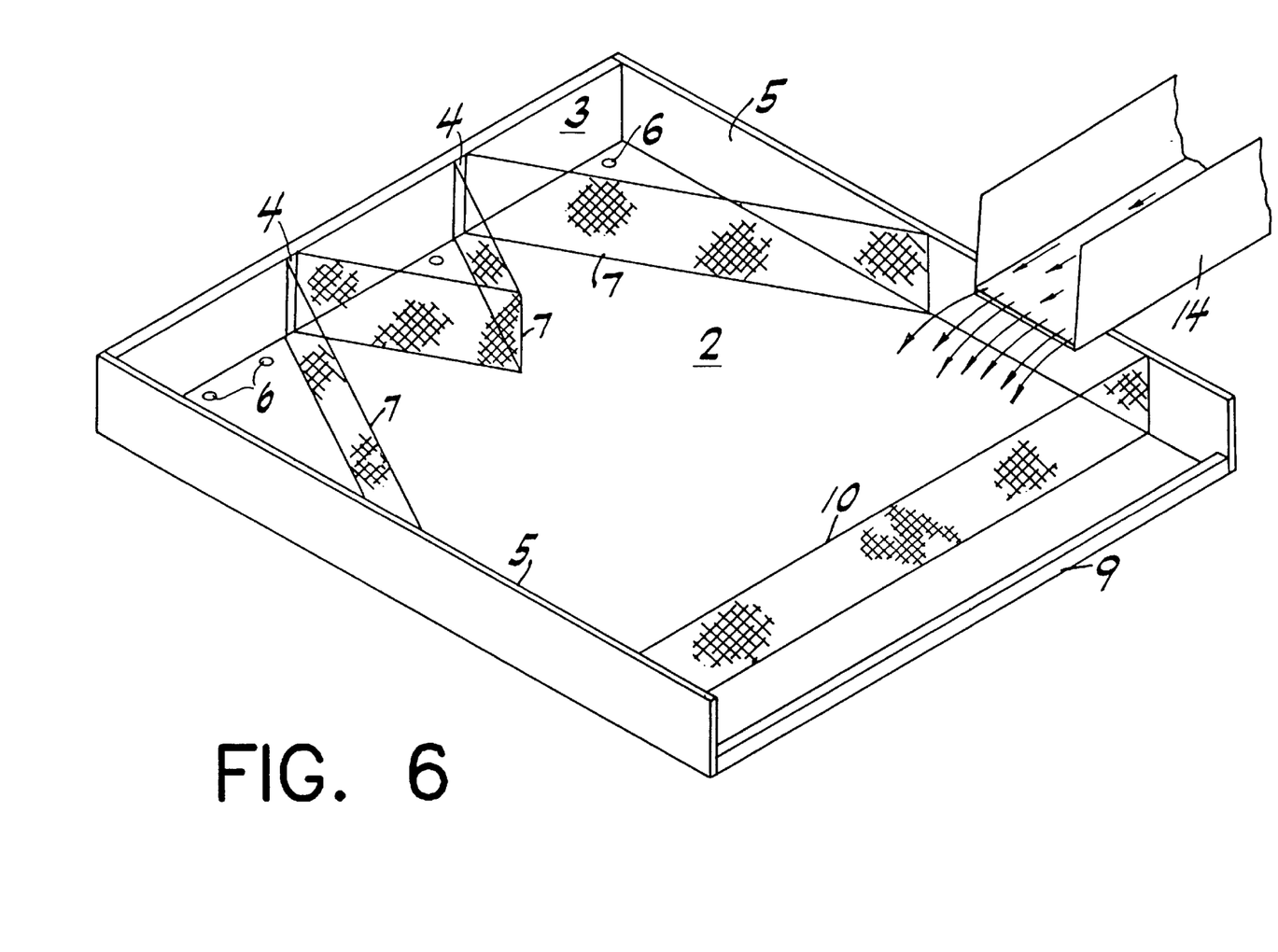
FIG. 6 is a perspective view of an alternative embodiment of the present invention.

Still other objects and advantages of the present invention will become readily apparent to those skilled in this art from the above-recited detailed description, wherein only the preferred embodiment of the invention has been shown and described. The description of the preferred embodiment is simply by way of illustration of the best mode contemplated for carrying out the invention. As will be realized, the invention is capable of other and different embodiments, and its several details are capable of modification in various obvious respects, all without departing from the invention. For example, the invention could be equipped with multiple exit apertures (as shown in FIGS. 4 and 6) to increase output, and the device could be fully enclosed rather than being open at the top. Accordingly, the drawings and descriptions are to be regarded as illustrative in nature, and not as restrictive.

It is claimed:

1. A device for volitionally orienting fish comprising:
   a) a vessel for holding water and fish, said vessel having a lower interior surface;
   b) an apertured end of the vessel, said apertured end having an exit aperture; and
   c) an interior surface of the vessel, said interior surface having a flow aperture, said flow aperture generating a flow in the water in the vessel, said flow being in a direction away from the apertured end.

2. A device as recited in claim 1, further comprising:
   a channel guide connected to the vessel, said channel guide guiding said fish toward the apertured end.

3. A device as recited in claim 2, wherein said channel guide has a plurality of apertures, said apertures having diameters less than the maximum cross-sectional diameter of said fish to be oriented.

4. A device as recited in claim 2, wherein said channel guide comprises an angled wall.

5. A device as recited in claim 2, wherein said channel guide comprises a mesh barrier.

6. A device as recited in claim 5, wherein said mesh barrier is angled toward the apertured end.

7. A device as recited in claim 1, wherein the color of said lower interior surface is white.

8. A device as recited in claim 1, wherein said lower interior surface is covered with a reflective coating.

9. A device as recited in claim 1, wherein said lower interior surface is covered with mirrored glass.

10. A device as recited in claim 1, wherein said flow aperture is in said lower interior surface.

11. A device as recited in claim 1, wherein said flow aperture is in the apertured end.

12. A device as recited in claim 1, wherein said flow aperture is in an interior side wall of the vessel.

13. A device as recited in claim 1, wherein said lower interior surface of the vessel has a plurality of flow apertures proximate to the apertured end for introducing water into the vessel.

14. A device as recited in claim 1, wherein a depth of the water at the exit aperture is less than twice the height of the fish to be oriented.

15. A device as recited in claim 1, wherein the vessel includes a depth control end.

16. A device as recited in claim 15, wherein said depth control end of the vessel is of a height less than the height of the apertured end.

17. A device as recited in claim 15, wherein said depth control end of the vessel is located opposite the apertured end.

18. A device as recited in claim 15, further comprising:
   a fish barrier connected to the vessel proximate to the depth control end, said fish barrier preventing fish from exiting the vessel at the depth control end.

19. A device as recited in claim 18, wherein said fish barrier has a plurality of apertures, said apertures having diameters less than the maximum cross-sectional diameter of the fish to be oriented.

20. A device as recited in claim 18, wherein said fish barrier comprises a mesh barrier.

21. A device as recited in claim 1, wherein said exit aperture has a minimum width of less than twice the maximum cross-sectional diameter of the fish to be oriented.

22. A device as recited in claim 1, wherein an interior surface of the vessel is slanted such that the depth of the water proximate to the apertured end of the vessel is less than the average depth of the water in the vessel.

23. A device for volitionally orienting fish comprising:
a) a vessel for holding water and fish;
b) an apertured end of the vessel, said apertured end having an exit aperture; and
c) an interior surface of the vessel; said interior surface being covered with a reflective coating for increasing the reflectiveness of the interior surface to light.

24. A method for volitionally orienting fish, each fish having a head end and a dorsal side, comprising the steps of:
a) introducing the fish into a vessel containing water and having an apertured end, said apertured end having an exit aperture; and
b) generating a flow in the water in the vessel in a direction away from the apertured end.

25. The method as recited in claim 24, further comprising the step of:
c) creating an environment within the vessel that is unsettling to the fish, whereby the fish volitionally exit the vessel through the exit aperture by swimming in a head-first, dorsal-side-up orientation.

26. A method as recited in claim 25, wherein the step of creating an environment that is unsettling to the fish includes:
introducing the fish into the vessel in a group.

27. A method as recited in claim 25, wherein the step of creating an environment that is unsettling to the fish includes:
introducing fish into the vessel so that the number of fish per square foot of swimmable water surface area in the vessel is greater than one.

28. A method as recited in claim 25, wherein the step of creating an environment that is unsettling to the fish includes:
maintaining the average depth of the water in the vessel at a level of less than twice the average height of the fish to be oriented.

29. A method as recited in claim 25, wherein the step of creating an environment that is unsettling to the fish includes:
illuminating the water in the vessel.

30. A method as recited in claim 25, wherein the step of creating an environment that is unsettling to the fish includes:
illuminating the lower interior surface of the vessel.

31. A method as recited in claim 25, wherein the step of creating an environment that is unsettling to the fish includes:
introducing sound waves into the water of the vessel.

32. A method as recited in claim 25, wherein the step of creating an environment that is unsettling to the fish includes:
introducing shock waves into the water of the vessel.

33. A method as recited in claim 25, wherein the step of creating an environment that is unsettling to the fish includes:
generating an odor in the water of the vessel.

34. A method as recited in claim 25, wherein the step of creating an environment that is unsettling to the fish includes:
introducing a chemical into the water of the vessel.

35. A method as recited in claim 25, wherein the step of creating an environment that is unsettling to the fish includes:
creating an electric current in the water of the vessel.

36. A method as recited in claim 25, wherein the step of creating an environment that is unsettling to the fish includes:
creating visual stimulus for the fish in the vessel.

37. A method as recited in claim 36, wherein creating visual stimulus for the fish in the vessel includes generating a dark color proximate to the apertured end and a light color proximate to the end opposite the apertured end.

38. A method as recited in claim 36, wherein creating visual stimulus for the fish in the vessel includes shading the apertured end from light.

39. A method as recited in claim 24, wherein the step of generating a flow in the water in the vessel includes:
introducing water into the vessel proximate to the apertured end.

40. A method as recited in claim 24, wherein the step of generating a flow in the water in the vessel includes:
introducing water into the vessel through the apertured end.

41. A method as recited in claim 24, wherein the step of generating a flow in the water in the vessel includes:
tilting the vessel such that the depth of the water in the vessel proximate the apertured end is less than the average depth of the water in the vessel.

42. A method as recited in claim 24, further comprising the step of:
maintaining the depth of the water at the exit aperture at a level less than twice the height of the fish to be oriented.

43. A method for volitionally orienting fish, each fish having a head end and a dorsal side, comprising the steps of:
a) introducing the fish into a vessel containing water and having an apertured end, said apertured end having an exit aperture; and
b) creating an environment within the vessel that is unsettling to the fish, whereby the fish volitionally exit the vessel through the exit aperture by swimming in a head-first, dorsal-side-up orientation.

44. A device for volitionally orienting fish, each fish having a head end and a dorsal side, comprising:
a) a vessel for holding water and fish, said vessel having interior surfaces, said interior surfaces comprising a lower interior surface, said vessel also having an apertured end, said apertured end having at least one exit aperture; and
b) means for generating a flow in the vessel in a direction away from the apertured end.

45. A device as recited in claim 44, further comprising:
means for creating an environment within the vessel that is unsettling to the fish.

46. A device as recited in claim 44, further comprising:
means for increasing the reflectiveness to light of an interior surface of the vessel.

47. A device as recited in claim 44, further comprising:
means for removing water from the vessel so that a given average depth of water in the vessel is maintained.

48. A device as recited in claim 45, wherein said means for creating an environment within the vessel that is unsettling to the fish comprises:
illuminating means for illuminating the water in the vessel.

49. A device as recited in claim 45, wherein said means for creating an environment within the vessel that is unsettling to the fish comprises:
illuminating means for illuminating the lower interior surface of the vessel.

50. A device as recited in claim 45, wherein said means for creating an environment within the vessel that is unsettling to the fish comprises:

acoustic means for introducing sound waves into the water of the vessel.

51. A device as recited in claim 45, wherein said means for creating an environment within the vessel that is unsettling to the fish comprises:

vibrational means for introducing shock waves into the water of the vessel.

52. A device as recited in claim 45, wherein said means for creating an environment within the vessel that is unsettling to the fish comprises:

odorous means for generating an odor in the water of the vessel.

53. A device as recited in claim 45, wherein said means for creating an environment within the vessel that is unsettling to the fish comprises:

chemical means for introducing a chemical into the water of the vessel.

54. A device as recited in claim 45, wherein said means for creating an environment within the vessel that is unsettling to the fish comprises:

electrical means for creating an electric current in the water of the vessel.

55. A device as recited in claim 45, wherein said means for creating an environment within the vessel that is unsettling to the fish comprises:

visual means for creating visual stimulus for the fish in the vessel.

56. A device for volitionally orienting fish, each fish having a head end and a dorsal side, comprising:

a) a vessel for holding water and fish, said vessel having interior surfaces, said interior surfaces comprising a lower interior surface, said vessel also having an apertured end, said apertured end having at least one exit aperture; and b) means for creating an environment within the vessel that is unsettling to the fish.

\* \* \* \* \*